United States Patent

[11] 3,604,855

[72] Inventor Uwe A. Pommerening
Webster, N.Y.
[21] Appl. No. 98
[22] Filed Jan. 2, 1970
[45] Patented Sept. 14, 1971
[73] Assignee Stromberg-Carlson Corporation
Rochester, N.Y.

[54] DIGITAL CONFERENCE CIRCUIT FOR PCM SIGNALLING SYSTEM
4 Claims, 1 Drawing Fig.

[52] U.S. Cl. .......... 179/18 BC
[51] Int. Cl. .......... H04m 3/56
[50] Field of Search .......... 179/18 BC, 1 CN

[56] References Cited
UNITED STATES PATENTS
3,293,369 12/1966 Schroeder .......... 179/18 BC

*Primary Examiner*—Kathleen H. Claffy
*Assistant Examiner*—Thomas W. Brown
*Attorneys*—Hoffman Stone and Charles C. Krawczyk

ABSTRACT: Signals from all conference channels are added in digital (binary) form and the sum is fed through a divider to an output register for distribution to all participating channels. The divider is set in response to a comparison between sums taken over predetermined successive intervals (about one-quarter second) and the maximum capacity of any one channel. The comparison made for each interval determines the divisor for the next interval.

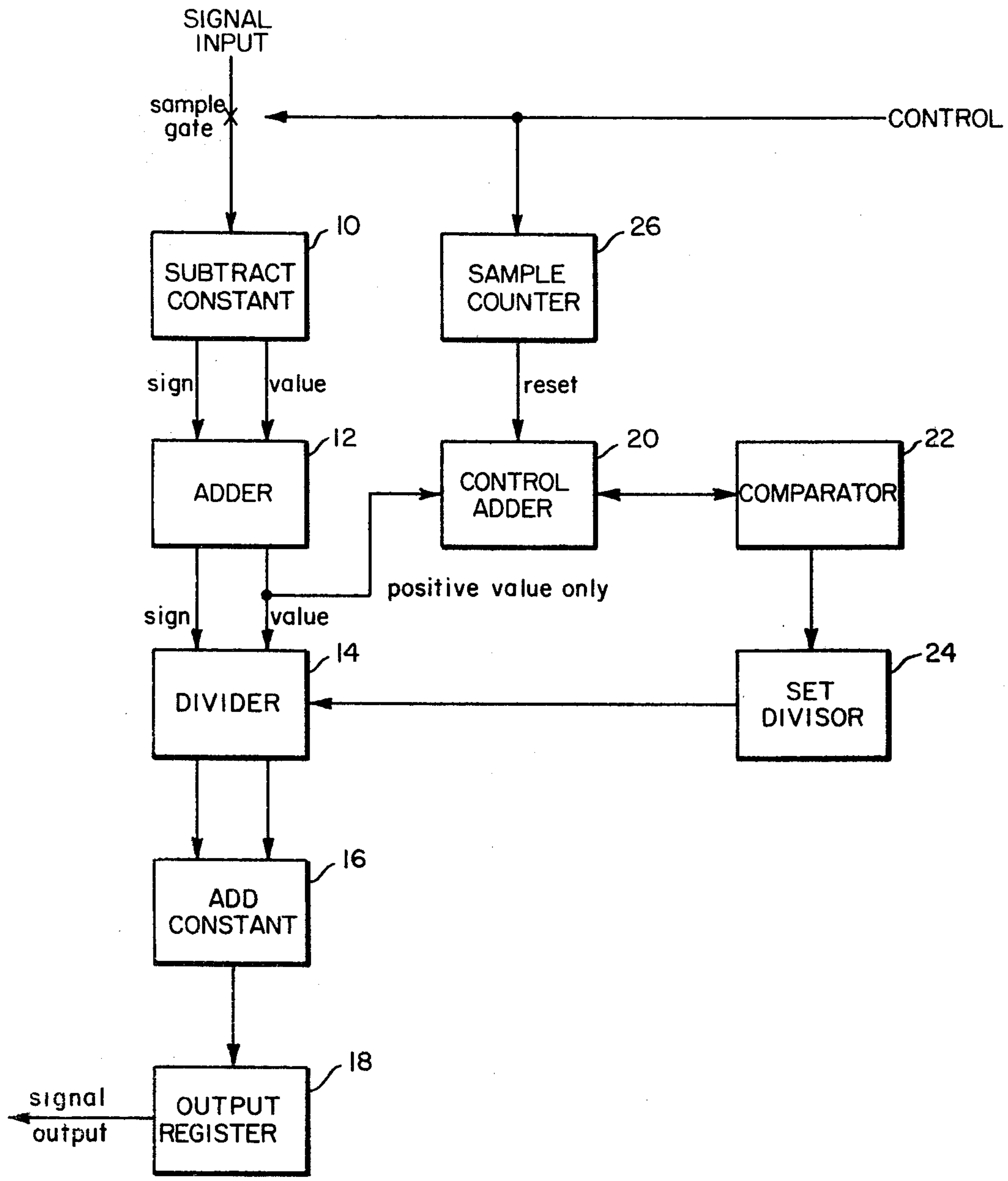
INVENTOR.
UWE A. POMMERENING
BY Hoffman Stone
ATTORNEY

DIGITAL CONFERENCE CIRCUIT FOR PCM SIGNALLING SYSTEM

BRIEF DESCRIPTION

This invention relates to a conference circuit for use in a time division multiplexed, pulse code modulated signalling system, and, more particularly, to a conference circuit in which the signals from the participants are handled in digital form only and without converting them to analog form.

Heretofore conference calls in PCM telephone systems have been arranged by decoding the PCM signals to convert them to analog signals, passing the analog signals through a conference circuit of known type, usually one with a negative impedance, to maintain the overall signal level in a desired range, and then encoding the conference signal into digital form. This practice is subject to the disadvantages that it requires expensive decoders and encoders, which introduce noise and distortion, along with their cost, together with all the usual problems and limitations of negative impedance control devices.

In a PCM system, it is not feasible simply to add the signals from all the participating channels and retransmit the resulting sum. If more than one participant is talking at any given time, the sum will often exceed the capacity of the receiving channels, with resulting clipping and distortion. For small conferences, it is feasible to add the signals from all the participating channels, divide the sum by the number of participants, and transmit the quotient to the participants. Signal attenuation limits this type of arrangement, because the divisor must equal the number of participants, and the portion of the quotient attributable to any one channel becomes unsatisfactorily small before the conference reaches respectable size.

Briefly, in accordance with the invention, signals from all of the conference channels are added, and the sum is passed through a divider before being transmitted to the participants. The divisor, however, is not simply the sum of the conferees, but is determined by the exigencies of the moment. If the sum of the incoming signals during any one interval of predetermined length exceeds the channel capacity, the divider is set to divide during the next succeeding interval by a divisor calculated to produce a quotient smaller than the channel capacity. Thus, when only one participant is speaking, the divisor remains at a value of one, and all participants receive signals at full strength. The signals are attenuated only in accordance with, and in response to, entrance of other participants into the conference simultaneously.

DETAILED DESCRIPTION

A representative embodiment of the invention will now be described in connection with the accompanying drawing, wherein the single figure is a block diagram of a conference circuit according to a presently preferred embodiment of the invention.

The circuit as shown is arranged for operation in conjunction with a conventional PCM system of the type operating at a frame rate of 8,000 Hz., and with 24 time-spaced channels of eight bits each in each frame. Seven bits in each channel are data bits, representing information to be transmitted between and among subscribers, and the eighth is a signalling bit used for supervision. The seven data bits allow for 128 quantum levels, which are transmitted without regard to algebraic sign. The level 64, therefore, corresponds to the absence of an input signal. Values below 64 are decoded as the negative portions of the analog signal, and those above 64 as the positive portions.

The circuit of the invention is simplified by arranging to deal for comparison purposes with signals representing only the positive portions of the analog signals. The value 64, therefore, is first subtracted from the incoming signals by a subtraction circuit 10. The signals are then added in an adder 12, which is arranged to accept 23 successive signals, one from each of 23 channels, leaving the 24th channel free for control uses. The sum from the adder 12 is delivered at the end of each frame to a divider 14. The value 64 is added to the quotient from the divider 14 by an adder 16, and the result is delivered to an output register 18 for distribution to the conferees during the next frame.

Operation of the divider 14 is controlled in response to a comparison between the capacity of any one channel and the actual signal load during successive intervals of 256 milliseconds. For this purpose, the output signals of positive sign from the adder 12 are fed to a control adder 20, which continues to add for the entire 256-millisecond interval. The control adder is reset by a comparator 22 each time it reaches the value of 46,000, which corresponds approximately to the calculated r.m.s. capacity of a channel in the PCM system over an interval of 256 milliseconds. Each time the comparator 22 is triggered to reset the control adder 20, it also steps a DIVIDE counter 24, the output of which is used to set the divisor in the divider 14 at the end of each 256-millisecond interval. The 256-millisecond interval is terminated by an 11-bit frame counter 26, which resets the control adder 20, the comparator 22, and the DIVIDE counter 24 at the end of each 2,048 frames.

The value 46,400 for the comparison count is an approximation, and is arrived at through a consideration of the PCM signalling characteristics. In the system for which the present circuit was designed, the quantum value indicating the maximum excursion of the analog signal from a reference level indicating the absence of a signal is 64. A channel appears only once per frame, and the maximum value it can accept for signals of either polarity over 2,048 frames is 2,048 times 64. The analog signals are alternating current signals, so we may divide the product by two, because the positive (or the negative) portions can be present only one-half the time, and we can also divide by $\sqrt{2}$ to allow for the r.m.s. value. The maximum count, therefore, that can occur for signal transmission in any one channel in the PCM system is approximately 46,400 over a 256-millisecond interval. The interval is chosen because it agrees fairly closely with the nominal 250-millisecond integration factor used in conventional telephone conference compensating circuits, and is the interval counted by an 11-bit counter (2048 counts) arranged to count at the 8,000 Hz. frame rate of the typical PCM system.

Overloading of the conference facility is avoided simply by dividing the sum of the input signals according to the number of times it exceeds the channel capacity.

The divider 14 may be arranged, as desired, for dividing selectively by divisors representing successive decimal integers, or for dividing on a binary basis, which results in a geometrically increasing divisor so that if the DIVIDE counter 24 is stepped three times during any one interval, for example, the divisor for the next interval would be eight. The binary division is generally preferred because it can be done with a fairly simple circuit. It tends to overcorrect for large input overloads, but in practice the overcorrection has been found to be well within tolerable limits, and the circuit of the invention will hold the outgoing conference signal within a range of +3 dbm to −3 dbm, regardless of the number of conferees.

If larger conferences than those with 23 participants are desired, the outputs of several of the described conference circuits can be combined by feeding them through another similar conference circuit in a pyramid arrangement.

I claim:

1. A digital conference circuit for a pulse-code-modulated telephone transmission system comprising a divider, means for counting the sum of the signal levels received from all conference channels during successive intervals of preselected duration, means for comparing the sum counted by said counting means during each interval with the calculated value of the maximum sum that can be transmitted in any one channel during one of said intervals, control means for selectively adjusting said divider to divide by different predetermined divisors in accordance with the output of said comparing means, means for adding signals from all received conference channels during each frame, means for feeding the sum produced by said adding means to said divider for division therein, and means for storing the output of said divider for the duration of the next frame.

2. A digital conference circuit for a pulse-code-modulated telephone system of the type in which signal transmission is based on a repetitive time frame of predetermined duration divided into time-spaced channels each including a predetermined number of time-spaced signal positions, said conference circuit comprising:

a. means for adding during each frame the quantum values of the signals received from all channels participating in a conference to produce a signal representing the sum of the quantum values,
b. a divider for dividing at the end of each frame the sum signal produced by said adding means selectively by any of a plurality of predetermined divisors, and
c. means for selecting one of the divisors in response to the value of the sum of the quantum values of the signals received from all channels in the conference during a predetermined number of frames.

3. A digital conference circuit according to claim 2, wherein selecting means includes:

a counter for counting to a sum calculated to approximate the capacity of a single channel for digital signals representing excursions of an analog signal in a selected polarity from a median reference potential during the predetermined number of frames,
b. means for resetting said counter each time it completes a count during the predetermined number of frames, and
c. a step counter arranged to step in response to operation of said resetting means, and to set the divisor in said divider in accordance with the condition of said step counter at the end of each predetermined number of frames.

4. A digital conference circuit for a pulse-code-modulated telephone system of the type in which signal transmission is based on a repetitive time frame of predetermined duration divided into time-spaced channels each including a predetermined number of time-spaced signal positions, said conference circuit comprising:

a. means for adding during each frame the quantum values of the signals received from all channels participating in a conference to produce a signal representing the sum of the quantum values,
b. a divider for dividing at the end of each frame the sum signal produced by said adding means selectively by any of a plurality of predetermined divisors,
c. means for storing the quotient signal produced by said divider for the duration of the next frame for transmission to the conference participants, and
d. means for selecting one of the divisors in response to the value of the sum of the quantum values of the signals received from all channels in the conference during the predetermined number of frames.